United States Patent [19]
Miura

[11] 3,839,068

[45] Oct. 1, 1974

[54] METHOD OF FORMING PHOSPHOR SURFACES OF COLOR CATHODE RAY TUBES

[75] Inventor: Kiyosi Miura, Mobara, Japan

[73] Assignee: Hitachi, Ltd., Tokyo, Japan

[22] Filed: June 1, 1971

[21] Appl. No.: 148,945

[30] Foreign Application Priority Data
June 1, 1970  Japan.................. 45-46386

[52] U.S. Cl. 117/335 C, 117/33.5 CM, 117/33.5 CP, 117/33.5 CS, 117/63, 117/46 CA
[51] Int. Cl. ....... B29c 25/00, B44d 1/04, B44d 1/44
[58] Field of Search 117/37.5 C, 37.5 CP, 37.5 CM, 117/37.5 CS, 63, 104

[56] References Cited
UNITED STATES PATENTS

| | | |
|---|---|---|
| 2,763,564 | 9/1956 | McKenzie et al. ............. 117/33.5 C |
| 2,910,376 | 10/1959 | Stankey et al. ............... 117/33.5 CP |
| 3,406,034 | 10/1968 | Komatsu et al. .............. 117/33.5 CS |
| 3,437,727 | 4/1969 | Boyhan et al. ........................ 117/63 |
| 3,443,008 | 5/1969 | Boyhan et al. ........................ 117/63 |
| 3,579,367 | 5/1971 | Patel............................ 117/33.5 CM |

*Primary Examiner*—William D. Martin
*Assistant Examiner*—William R. Trenor
*Attorney, Agent, or Firm*—Craig & Antonelli

[57] ABSTRACT

In a method of forming a metal backed phosphor surface wherein an organic film is first formed on the phosphor surface of the phosphor film formed on the inner surface of the face plate of a color cathode ray tube, and then an aluminum film is vapor deposited on the organic film: the surface layer of the organic film being dissolved to remove relatively fine pinholes in the organic film before the deposition of the aluminum film.

12 Claims, No Drawings

METHOD OF FORMING PHOSPHOR SURFACES OF COLOR CATHODE RAY TUBES

BACKGROUND OF THE INVENTION

This invention relates to a method of forming flourescent surface on a color cathode ray tube.

It is well known to form a vapor deposited film of aluminum on the back (the side facing to the electron gun) of a phosphor film applied on the inner surface of the face plate of a color cathode ray tube for the purpose of increasing the intensity of the flourescence emanated from the phosphor film. Such a phosphor film is called a metal backed phosphor film.

Since the surface of the phosphor film is not smooth and flat but includes a plurality of recesses or openings (i.e., pinholes), if the aluminum film were deposited directly on the surface of the phosphor film it would be difficult to form an aluminum film having a flat and smooth surface, and hence one that is highly reflective, due to the fact that the deposited aluminum enters into the recesses or openings (i.e., pinholes). To solve this problem it has been proposed to form a flat film of an organic substance undergoing ready pyrolysis upon the back surface of the phosphor film and then to deposit the aluminum film on the organic film. Such a method is known as the filming process. The organic film formed by the filming process is removed by decomposing the film by heating.

The organic film formed by the filming process is required to have a flat and smooth surface and to be free from pinholes. However, such an organic film inherently contains pinholes causing the formation of pinholes also in the vapor-deposited aluminum film. For this reason even with the filming process it has been difficult to improve sufficiently the reflectiveness of the vapor-deposited aluminum film.

SUMMARY OF THE INVENTION

This invention contemplates a method for eliminating the problems of the known processes. Thus, the distribution of the pinholes in the vapor-deposited aluminum film has been investigated and the following facts have been found. More, particularly, regions of the organic film in contact with the phosphor dots contain very small pinholes, but not large pinholes. On the other hand, regions of the organic film, not contributing to luminescence, that is the regions of the organic film in contact with the regions or areas between the phosphor dots contain relatively large pinholes. It has been found that, the pinholes in the regions of the organic film in contact with the phosphor dots have the effect of decreasing the reflectiveness of the aluminum film, as above mentioned; whereas the relatively large pinholes in the regions of the organic film in contact with the areas between the phosphor dots play an important role on the reflectiveness. More particularly, the relatively large pinholes in the regions of the organic film act as vent holes for gases produced by the decomposition of the organic film, or of polyvinyl alcohol or other organic compounds contained in the phosphor film at the time of baking (which is performed subsequent to the formation of the aluminum film on the organic film) thereby effectively preventing the aluminum film from bulging and preserving the bonding strength between the aluminum film and the phosphor film.

Accordingly, it is an object of this invention to provide a novel method of forming a phosphor surface of a color cathode ray tube capable of eliminating pinholes in the organic film formed on the phosphor film so as to improve the reflectiveness of the aluminum film vapor-deposited on the phosphor film.

Another object of this invention is to provide an improved method of forming a phosphor surface of a cathode ray tube capable of eliminating pinholes in the regions of the organic film on the phosphor film in contact with the phosphor dots so as to improve the reflectiveness of the aluminum film vapor-deposited on the phosphor film.

Yet another object of this invention is to provide a novel method of forming a phosphor surface of a color cathode ray tube wherein pinholes in the regions of the organic film on the phosphor film in contact with the areas between phosphor dots are caused to remain; whereas pinholes in the regions of the organic film in contact with the phosphor dots are eliminated so as to preserve the bonding force between the aluminum film and the phosphor film and to improve the reflectiveness of the vapor-deposited aluminum film in contact with the regions containing the phosphor dots and contributing to the luminescence.

DESCRIPTION OF THE PREFERRED EMBODIMENT

One aspect of the method of this invention resides in a surface dissolving treatment characterized in that the surface portion of an organic film is only slightly dissolved with a mixed solvent before the vapor deposition of an aluminum film on the organic film so as to eliminate minute pinholes in the regions of the organic film in contact with the phosphor dots and to allow or cause relatively large pinholes to remain in the regions or areas between phosphor dots; without perfectly eliminating such relatively large pinholes. The mixed solvent utilized in this invention for dissolving the surface layer of organic film comprises a mixture containing at a proper ratio a solvent which will readily dissolve the organic film (i.e., a good solvent for the organic film) such as acetone, methyl-ethyl-ketone, alcohols such as ethanol, methyl Cellosolve, and dioxane, and a poor solvent which will scarcely or slightly dissolve the organic film (i.e., a poor solvent for the organic film) such as n-hexane, toluene, xylene, and other hydrocarbons. Such organic films include those formed from the polyvinyl resins, and other suitable polymers.

To facilitate a better understanding of the invention, the following example is given for illustrating the application of the invention to production of a color cathode ray tube.

First a phosphor film was formed on the inner surface of the face plate of a color cathode ray tube by a well known method. Then an emulsion of a resin (e.g., a polyvinyl resin such as polyvinyl alcohol, polyvinyl chloride, polystyrene or polyvinylacetate) was applied on the phosphor film and the resin film was heat-dried to form an organic film. Then a 1 : 2 mixed solvent of ethanol and n-hexane was sprayed onto the organic film while the face plate was heated to about 50°C to dissolve the surface layer of the organic film. In this example, 0.05 cc of the mixed solvent was sprayed onto each unit area of the organic resin for about 10 seconds with a spray gun. As a result of this surface treatment of the organic film the fine pinholes in the organic film in the regions thereof in contact with the phosphor dots were completely eliminated, leaving flat and smooth surfaces whereas the relatively large pinholes in the organic film adjacent to the area between the phosphor dots were retained unchanged before and after the solvent treatment. Thereafter an aluminum film was vapor-deposited upon the treated organic film and the assembly was baked at a temperature higher than the decomposition temperature of the organic or resin film. The gases produced by the decomposition of the organic material contained in the phosphor film were vented to the atmosphere through the remaining large pinholes. The result of measurement showed that the quantity of flourescence of the color cathode ray tube embodying the invention was increased by about 5 percent when compared with the prior art color cathode ray tube. As above described, since the pinholes in the regions of the organic film not in contact with phosphor dots remain unchanged it is possible to completely eliminate such problems as the bulge of the vapor-deposited aluminum film, which is otherwise caused at the time of baking the aluminum film.

The following table shows other embodiments of this invention showing different solvents used to treat the surface of the organic film of the polyvinyl resin as well as different quantities sprayed per unit area of the organic film and different temperatures.

Table

|    | Mixed solvent | Ratio of mixing | Quantity per unit area | Treating temp. | Treating time |
|----|---------------|-----------------|------------------------|----------------|---------------|
| 1. | Methylethyl-ketone<br>n-hexane | 1 part to<br>2 parts | 0.05 cc | 60 C | 20 sec. |
| 2. | Acetone<br>toluene | 1 part to<br>3 parts | 0.05 cc | 50 C | 20 sec. |
| 3. | ethyl alcohol<br>n-hexane | 1 part to<br>1 part | 0.001 cc | 40 C | 10 sec. |

The same results as in the first embodiments were obtained.

I claim:

1. A method of forming a phosphor surface of a color cathode ray tube comprising the steps of forming a phosphor film consisting of a plurality of phosphor dots on the inner surface of the face plate of a cathode ray tube, forming an organic film on said phosphor film, said organic film containing relatively small pinholes in those regions in contact with said phosphor dots of said phosphor film and relatively large pinholes in those regions in contact with the areas between the phosphor dots, heating said face plate and said organic film, applying a mixed solvent onto the organic film for a short period of time while the face plate is heated to dissolve the surface layer of said organic film thereby removing the relatively small pinholes and providing flat and smooth surfaces on the regions of said organic film in contact with said phosphor dots, vapor-depositing an aluminum film on said organic film and heating the resulting layered assembly to decompose and remove said organic film.

2. The method of claim 1, wherein the organic film is selected from the group consisting of polyvinyl alcohol, polyvinyl chloride, polystyrene and polyvinyl acetate.

3. The method of claim 1 wherein said surface layer of said organic film is dissolved by spraying onto the surface of said organic film a mixed solvent consisting of a first organic solvent which dissolves said organic film and a second organic solvent whish slightly dissolves said organic film.

4. The method of claim 3 wherein said mixed solvent is a 1 : 1 to 1 : 3 mixture of said first organic solvent and said second organic solvent.

5. The method of claim 3 wherein said organic film is formed from an emulsion of a resin, said first organic solvent is selected from the group consisting of acetone, methylethyl ketone, alcohols, methyl Cellosolve and dioxane, and said second organic solvent is selected from the group consisting of n-hexane, toluene, xylene and other hydrocarbons.

6. The method of claim 3 wherein said mixed solvent is sprayed onto the surface of said organic film at a rate of from 0.001 to 0.05 cc per unit area of said surface for 10 to 20 seconds while said organic film is heated to a temperature ranging from 40° to 60°C.

7. The method of claim 3 wherein said mixed solvent comprises a 1 : 2 mixture of ethanol and n-hexane.

8. The method of claim 3 wherein said mixed solvent comprises a 1 : 2 mixture of methylethyl ketone and n-hexane.

9. The method of claim 3 wherein said mixed solvent comprises a 1 : 3 mixture of acetone and toluene.

10. The method of claim 3 wherein said mixed solvent comprises a 1 : 1 mixture of ethanol and n-hexane.

11. The method of claim 5, wherein the resin is a polyvinyl resin.

12. The method of claim 5, wherein the resin is selected from the group consisting of polyvinyl alcohol, polyvinyl chloride, polystyrene and polyvinyl acetate.

* * * * *